(12) United States Patent
Yao et al.

(10) Patent No.: US 11,430,266 B1
(45) Date of Patent: Aug. 30, 2022

(54) UNMARKED BODY MOTION TRACKING SYSTEM BASED ON MULTI-CAMERAS

(71) Applicant: Beijing Institute of Technology, Beijing (CN)

(72) Inventors: Shouwen Yao, Beijing (CN); Ruosi Kong, Beijing (CN); Lihui Li, Yangcheng County (CN); Fuxiang Chang, Chengdu (CN); Zeling Lan, Gao an (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 17/573,069

(22) Filed: Jan. 11, 2022

(30) Foreign Application Priority Data

Jun. 1, 2021 (CN) .......................... 202110608853.3

(51) Int. Cl.
| | | |
|---|---|---|
| *G06V 40/20* | (2022.01) | |
| *G06N 5/00* | (2006.01) | |
| *G06T 7/10* | (2017.01) | |
| *G06V 20/20* | (2022.01) | |
| *G06V 40/10* | (2022.01) | |
| *G06T 7/20* | (2017.01) | |

(Continued)

(52) U.S. Cl.
CPC .......... *G06V 40/23* (2022.01); *G06N 5/003* (2013.01); *G06T 7/10* (2017.01); *G06T 7/20* (2013.01); *G06T 7/50* (2017.01); *G06T 7/70* (2017.01); *G06V 20/20* (2022.01); *G06V 40/10* (2022.01); *G06T 2207/10028* (2013.01); *G06T 2207/20044* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2016/0019417 A1* | 1/2016 | Kobayashi | G06V 40/50 382/118 |
| 2019/0191098 A1* | 6/2019 | Ishii | H04N 5/23218 |
| 2021/0127091 A1* | 4/2021 | Oami | H04N 5/23299 |

OTHER PUBLICATIONS

Dong Mingda, "Design and implementation of large-scale user tracking system based on multi Kinect", Chinese excellent master's thesis full text database information technology series, Jan. 15, 2019, pp. I138-4322, vol. 2019, issue 1.

* cited by examiner

*Primary Examiner* — Matthew C Bella
*Assistant Examiner* — Brian D Shin
(74) *Attorney, Agent, or Firm* — WPAT, PC (57) ABSTRACT

An unmarked body motion tracking system based on multi-Kinect V2 is provided and includes: Kinect V2s, configured to acquire depth data and joint data; analysis modules, configured to analyze data collection characteristics of single Kinect V2 and transmission device assembly requirements; clients, configured to receive and process data collected by Kinect V2s. A process of the data processing includes: based on the data collection characteristics of the single Kinect V2, a client-server model is built to track a human body from different directions; output modules, configured to output layout modes and tracking results of the Kinect V2s. According to the data collection characteristics of the single Kinect V2 and the transmission device assembly requirements, the disclosure minimizes the mutual interference between the opposite Kinect V2s, tracks the human (Continued)

body from different directions, and ensures that the joints in the self-occlusion state are stably tracked by sensors at other angles.

6 Claims, 7 Drawing Sheets

(51) Int. Cl.
*G06T 7/50* (2017.01)
*G06T 7/70* (2017.01)

FIG. 1

Scheme 1

FIG. 2A

Scheme 2

FIG.2B

Scheme 3

FIG.2C

Scheme 4

UNMARKED BODY MOTION TRACKING SYSTEM BASED ON MULTI-CAMERAS

TECHNICAL FIELD

The disclosure relates to the technical field of virtual reality, in particular to an unmarked body motion tracking system based on multi-Kinect® V2.

BACKGROUND

As a very natural human-computer interaction, human body motion capture plays an important role in both computer and industrial fields. The devices of human body motion capture in virtual environment mainly include the electromagnetic position tracker, ultrasonic position tracker, inertial position tracker and optical position tracker, among which the mainstream human tracking devices are the inertial system and optical motion capture system. Based on computer vision, the representative unmarked device of optical tracking device is Kinect® sensor. The release of Microsoft Kinect® V1 in 2010 is an important milestone, which makes a low-cost sensor provide fast and high-quality intensive depth images available for the first time, and visual algorithms is used to track human joints without wearing special clothes or reflective markers. Kinect® can realize motion recognition through the raw data acquired by depth sensors, which can be used in various human interactive applications including games, and realize low-precision human joints tracking in a convenient and low-cost way. Kinect® has been widely commercialized in gesture recognition, motion tracking, virtual assembly training, medical rehabilitation training and other areas.

The principle of obtaining three-dimensional (3D) data of joints by Kinect® V1 SDK is to classify each pixel of depth image as a part of joints by using trained decision forest. However, in the absence of high-precision depth information, it is a challenge for unmarked motion capture to ensure sufficient tracking accuracy, which leads to the fact that the unmarked motion capture can't be directly applied to industrial fields. Kinect® V2 was successfully released in 2014. Compared with Kinect® V1, Kinect® V2 provides better tracking performance, and has greatly improved the resolution of image acquisition, the accuracy of depth data acquisition, the tracking range, the number of tracked bones' joints, facial expression detection, etc., but there are still great problems with only one single Kinect® V2 for motion tracking.

As for the limitations of single Kinect® in motion capturing, domestic and foreign researchers are mostly focused on how to solve the occlusion problem. Interpolation method is widely used to estimate missing data, but it can't meet the real-time requirement because the data before and after missing should be available. Although some solutions improve the tracking accuracy by improving the skeleton extracted by the single view, problems such as self-occlusion and inability to distinguish between front and back of human body can't be solved. For Kinect®, which is a low-cost camera, it is generally accepted that a better solution is to introduce multiple Kinect® sensors into a workspace to measure the tracked objects from different angles, so as to ensure that the bones in the self-occlusion state can be tracked stably by sensors at other angles, and the measurement results from different sensors may be fused to achieve more accurate and robust bone tracking compared with a single sensor.

In order to solve the problems of narrow field of vision, serious self-occlusion and inability to distinguish the front of human body with a single Kinect®, the collected bone data is obviously not accurate enough for industrial applications, and it will affect the experience of human-computer interaction and cannot reasonably evaluate the human-computer ergonomics of products. At present, multiple Kinect® sensors are used to complement each other in space to solve the problem. However, the conventional method is based on two or more Kinect®s, which can be connected to a computer, thus reducing the requirement on the number of computers to a certain extent, which increases the computing burden of a computer, thus affecting the real-time performance of the system with the reason that one computer only processes the data of one Kinect®. Therefore, a better solution to arrange multiple Kinect® sensors reasonably, however, is not found out yet.

SUMMARY OF THE DISCLOSURE

Aiming at the shortcomings of the prior art, in order to make up for various defects of human body capture with a single Kinect® V2, the disclosure aims to provide a high-precision unmarked whole-body motion system based on Kinect® V2. Multiple Kinect® V2 sensors are introduced into the scene, the sensors are reasonably arranged, and various schemes are designed to optimize the number, installation height and orientation of Kinect® V2 sensors with stable tracking area, body activity area and assembly space coverage as indicators, so as to meet the requirements of virtual assembly of transmission devices and lay a foundation for accurate modeling of human skeleton.

An unmarked body motion tracking system based on multi-Kinect® V2s includes:

a plurality of Kinect® V2s, each of the plurality of Kinect® V2s is configured for acquiring depth data and skeletal data (also referred to as joint data or skeletal joint data or bone data or bone joint data);

a plurality of analysis modules, each of the plurality of analysis modules is configured for analyzing data collection characteristics of corresponding one of the plurality of Kinect® V2s and assembly requirements of transmission device, and the data collection characteristics include a working range of best tracking area and physical limits of the corresponding one of the plurality of Kinect® V2s;

a plurality of clients, each of the plurality of clients is configured for receiving the skeletal joint data from corresponding one of the plurality of Kinect® V2s and processing the skeletal joint data, and a process of the processing includes: based on the data collection characteristics of the corresponding one of the plurality of Kinect® V2s, building a client-server model to track a human body from different directions, so as to ensure that the joints of the human body in a self-occlusion state are stably tracked by sensors of ones of the plurality of Kinect® V2s at other angles;

a plurality of output modules, each of the plurality of output modules is configured to output a layout mode and a tracking result of corresponding one of the plurality of Kinect® V2s.

In some embodiment, the analysis module, the client and the output module corresponding to the same Kinect® V2 are software modules, which are stored in one or more memories of a same client computer, and executable by one or more processors of the same client computer coupled to the one or more memories.

Preferably, based on the assembly requirements of transmission device, a layout of the plurality of Kinect® V2s is constructed, and factors affecting the layout include a stable tracking area, a body activity area and an assembly space coverage rate; rationality of a design method of the layout is judged based on the stable tracking area, the body activity area and the assembly space coverage rate.

Preferably, a size of an assembly workspace is designed, and a center of the assembly workspace is made coincide with a center of a N-Kinect® V2 system including the plurality of the Kinect® V2s;

according to the N-Kinect® V2 system, a region where number of ones of the plurality of Kinect® V2s for comfort tracking is larger than N/2 is defined as a stable tracking region and the stable tracking area is calculated; N is a positive integer greater than 1;

according to the N-Kinect® V2 system, based on a cone-shaped tracking range of Kinect® V2, the activity area is defined as an area surrounded by regular polygons connected with the plurality of Kinect® V2s as vertices;

a ratio of an area of a part of the stable tracking area located in the assembly workspace to an area of the assembly workspace is defined as the assembly space coverage rate.

Preferably, the plurality of Kinect® V2s are evenly distributed on a circle with a diameter of M meters, and each of the plurality of Kinect® V2s is placed at a height of 1 m-1.5 m from ground to realize stable and flexible setting for capturing the human body;

the each of the plurality of Kinect® V2s is connected to the corresponding client through a USB interface; the client collects the skeletal data through an open source Toolkit provided by Microsoft and convert the skeletal data into global coordinates, and finally transmits the global coordinates to a client computer through USB data.

Preferably, each of the plurality of Kinect® V2s performs data collection at a rate of 30 frames per second, which can realize a more accurate integration of multi-source skeleton information even if a time synchronization is not realized.

Preferably, each of the plurality of Kinect® V2s separates collected pixel points according to distance information in a depth image, which a basic area and an edge area of the human body are determined by image processing technology. A trained random forest model is used to perform limb separation of the determined edge area of the human body, and finally makes multi-view-angle analysis on the separated human body parts to identify 3D body joint points.

Preferably, each of the plurality of clients includes:

a data acquisition and preprocessing module, configured for receiving and processing the skeletal data collected by a corresponding Kinect® V2 sensor;

a data visualization module, including a first visualization module, a second visualization module and a third visualization module, configured for displaying the processed skeletal joint data, client working state, and a skeletal drawing area respectively;

the data visualization module further includes a tracking module, configured to judge whether tracking the skeletal joint data is successful; if the tracking is successful, the skeletal data will be displayed in the first visualization module, and if not, current frame data is ignored, that is, it does not make any contribution to data fusion of the server;

a data communication module, configured to establish communication between the client of the corresponding Kinect® V2 sensor and the server, so as to be convenient for real-time collection of the skeletal joint data of the human body.

It is worth mentioning that, in some embodiments, the data acquisition and preprocessing module is embodied by at least one processor and at least one memory coupled to the at least one processor, and the at least one memory stores programs executable by the at least one processor. Likewise, the data visualization module is embodied by at least one processor and at least one memory coupled to the at least one processor, and the at least one memory stores programs executable by the at least one processor. Likewise, the first visualization module is embodied by at least one processor and at least one memory coupled to the at least one processor, and the at least one memory stores programs executable by the at least one processor. Likewise, the second visualization module is embodied by at least one processor and at least one memory coupled to the at least one processor, and the at least one memory stores programs executable by the at least one processor. Likewise, the third visualization module is embodied by at least one processor and at least one memory coupled to the at least one processor, and the at least one memory stores programs executable by the at least one processor. Likewise, the tracking module is embodied by at least one processor and at least one memory coupled to the at least one processor, and the at least one memory stores programs executable by the at least one processor. Likewise, the data communication module is embodied by at least one processor and at least one memory coupled to the at least one processor, and the at least one memory stores programs executable by the at least one processor.

Preferably, the client converts data to the skeletal joint data format expressed in a form of skeletal joint three-dimensional data collected by the sensor of the corresponding Kinect® V2 and transmits the skeletal joint 3D data after the converting data format to a server, and the server uses data fusion algorithms with the skeletal joint data from the plurality of clients to form a robust body skeleton model, which is visualized by Unity3D engine; a network switch connects the client and the server into a local area network at the same time.

The technical scheme has the beneficial effects that: according to the data collection characteristics of a single Kinect® V2 and the transmission device assembly requirements, the disclosure minimizes the mutual interference between the opposite Kinect® V2s, and can track the human body from different directions at the same time, and ensures that the skeletons in the self-occlusion state are stably tracked by sensors at other angles.

DETAILED DESCRIPTION OF EMBODIMENTS

In order to make the purpose, technical scheme and advantages of this application clearer, this application will be further described in detail below with reference to the drawings and examples. It should be understood that the specific embodiments described herein are only used to explain the application, and are not used to limit the application.

Figure 1:
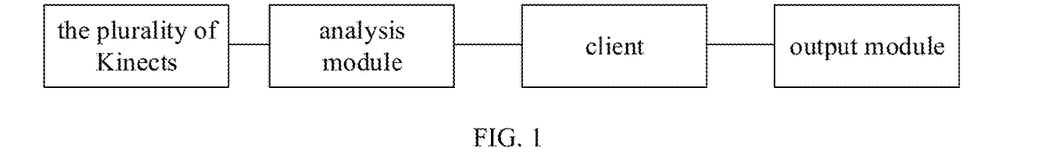
FIG. 1 is a schematic flow diagram of the disclosure.
Figure 2A:
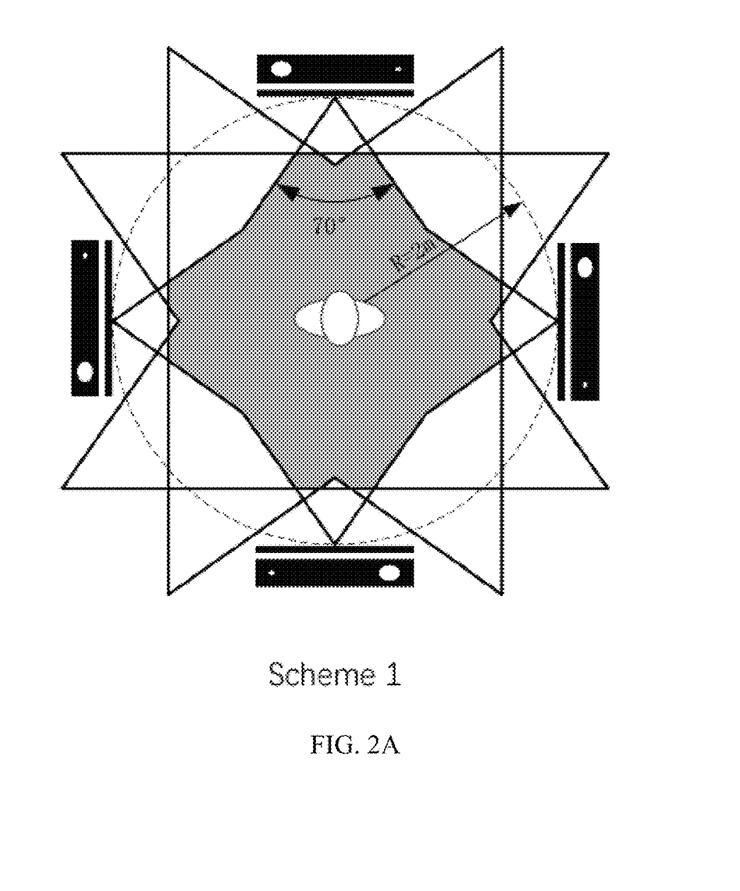
FIG. 2A through FIG. 2D are schematic diagrams of stable tracking areas of four layout schemes of the disclosure respectively.
Figure 2B:
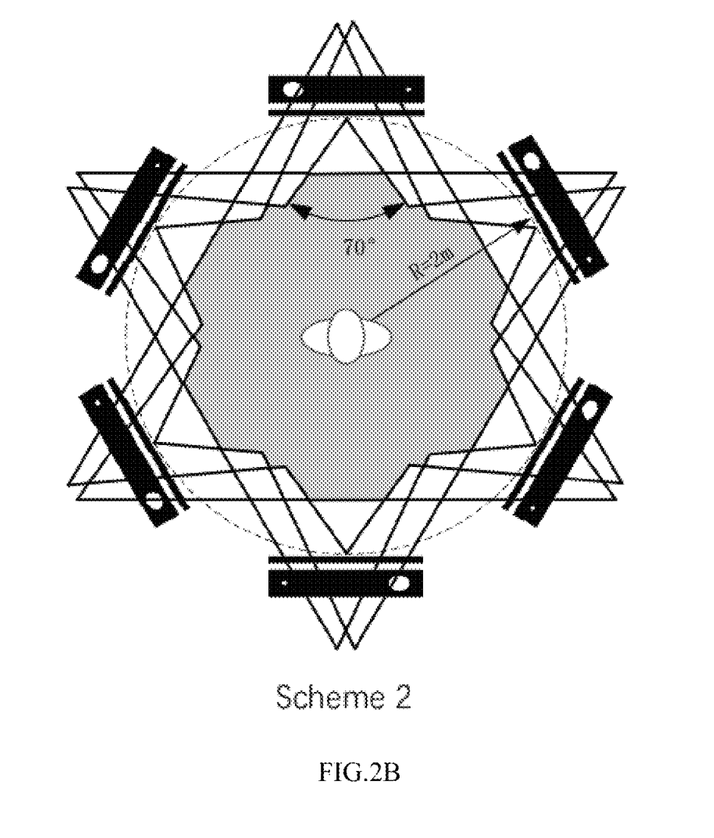
Figure 2C:
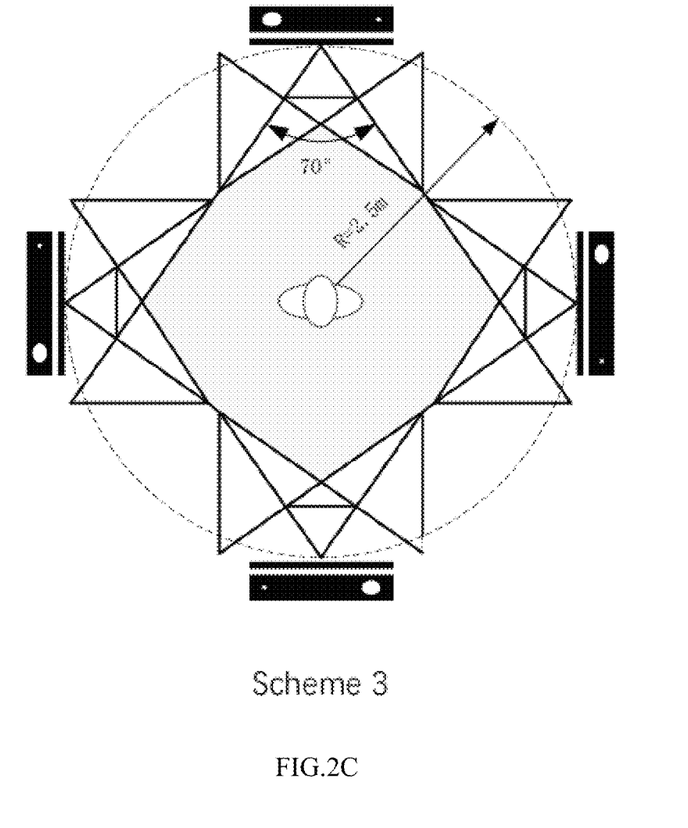
Figure 2D:
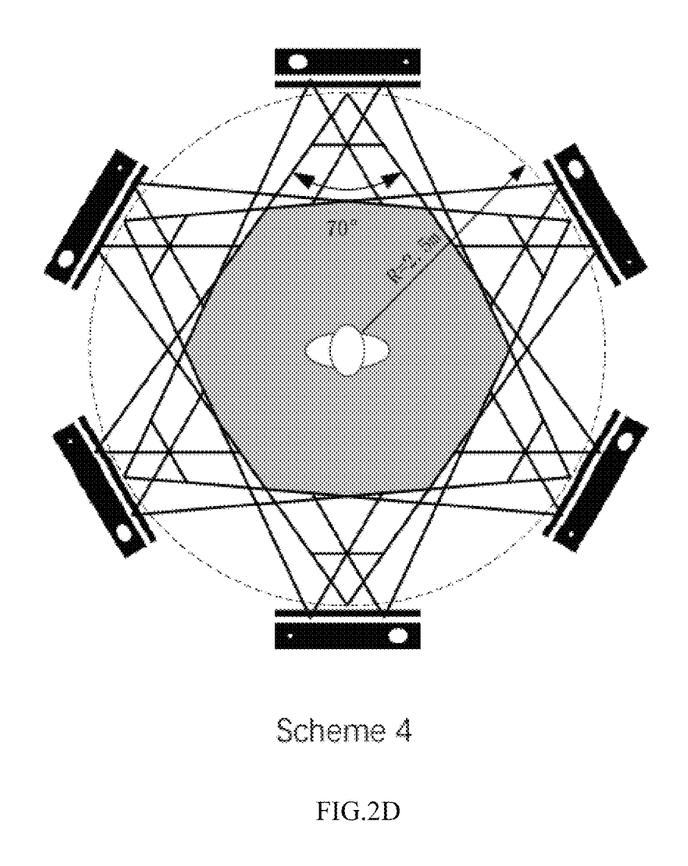

As shown in FIG. 1, an unmarked body motion tracking system based on multi-Kinect® V2 is constructed. Considering the volume of transmission device and the range of users' activities, the layout of the system is mainly decided by the shape of the workspace, the number of Kinect® V2, the distribution of Kinect® V2, and other factors. According to the disclosure, the system is arranged by the indicators which are the stable tracking area, the activity area and the assembly space coverage rate with the minimum of mutual interference among the Kinect® V2s, the maximum the complete tracking of joints, and the minimum the system cost to obtain the largest coverage rate of the working space as much as possible.

Because Kinect® V2 sensor (also referred to as sensor of Kinect® V2) can only emit infrared light in a cone-shaped area in one direction to scan the objects in the area, there are many common problems of depth cameras, typically the self-occlusion of tracked objects. In view of the typical assembly posture analysis of the 3rd shaft assembly of a transmission device in the assembly process, such as carrying the shift clutch, where the body will move in the assembly space, some limbs will block other limbs, and the blocked bone (also referred to as skeleton) joint data cannot be tracked, which ultimately seriously impairs credibility of the collected data. Therefore, multiple Kinect® V2 sensors (also referred as sensors of the plurality of Kinect® V2s) are used to track the human body from different directions to ensure that the joints in the self-occlusion state are stably tracked by sensors at other angles.

The sensors layout design is mainly influenced by the shape of the workspace, the number of sensors, the position of sensors and the coverage rate of the workspace. The aim of the disclosure is to achieve the best coverage rate of the workspace by maximizing the number of tracked joints and minimizing the mutual interference of sensors.

Considering the assembly requirements of transmission devices, the size of the assembly workspace is set as 3 m×2.5 m×2.7 m, and the center of the assembly workspace coincides with the center of N-Kinect® V2 (N represents the number of the plurality of Kinect® V2s) system. Considering that the comfort tracking area (also referred to as sweep cone) of Kinect® V2 is 1.2 m-3.5 m, four layout schemes are designed, namely uniformly distribute 4-Kinect® V2 (Scheme 1), 6-Kinect® V2 (Scheme 2) on a circle with a diameter of 4 m, 4-Kinect® V2 (Scheme 3), and 6-Kinect® V2 (Scheme 4) on a circle with a diameter of 5 m respectively.

The following three measurement parameters are put forward for the selection of the scheme:

1. Stable tracking area: for N-Kinect® V2 system, the area where the number of Kinect® V2 for comfort tracking is greater than N/2 can be defined as the stable tracking area, that is to say, the stable tracking area of 4-Kinect® V2 system should have at least 3-Kinect® V2 for stable tracking in the area, and the stable tracking area of 6-Kinect® V2 system should have at least 4-Kinect® V2 for stable tracking in the area. The stable tracking areas of four schemes are shown in FIG. 2A through FIG. 2D, respectively.

Figure 3A:
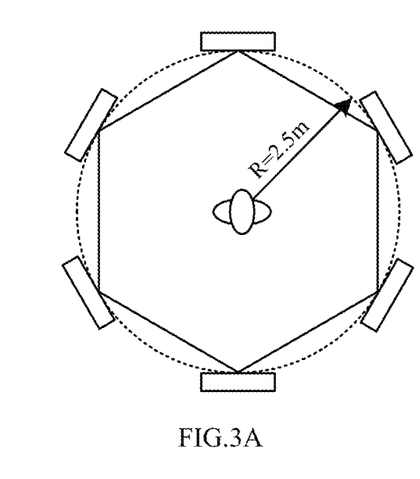
FIG. 3A and FIG. 3B are schematic diagrams of the activity area and the assembly space coverage rate in scheme 4 of the disclosure respectively.

2. Activity area: for the N-Kinect® V2 system, it is necessary to put a warning line around the system to protect the system. Considering the cone-shaped tracking range of Kinect® V2, the activity area is defined as the area surrounded by polygons connected by Kinect® V2s as vertices, and the polygons are regular polygons respectively. The gray area in FIG. 3A is the user's activity area in Scheme 4.

Figure 3B:
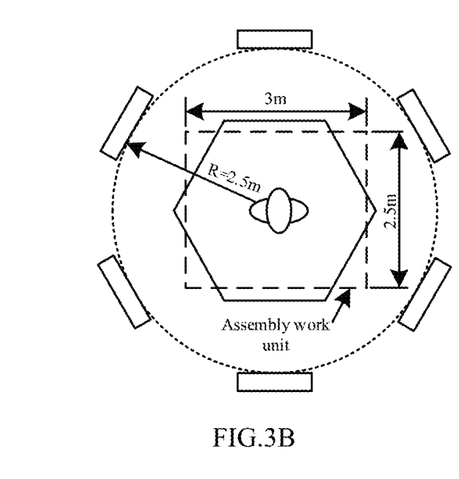

3. Assembly space coverage rate: for the proposed assembly space of 3 m×2.5 m×2.7 m, the ratio of the stable tracking area in the assembly space to the assembly space area is defined as the assembly space coverage, and the schematic diagram of assembly space coverage in Scheme 4 is shown in FIG. 3B.

Table 1 shows the changes of the above measurement parameter values in four schemes. It is found that the assembly space coverage rates of schemes 2, 3 and 4 is significantly bigger than that of scheme 1, but there is not much difference between stable tracking area and assembly space coverage rates of schemes 2, 3 and 4. Because of the distribution radius, the activity areas of schemes 3 and 4 are significantly larger than those of schemes 1 and 2. Therefore, if schemes 1 and 2 are abandoned, and there is still a need for further distinguishing scheme 3 from scheme 4.

TABLE 1

| Measurement Parameters | Scheme 1 | Scheme 2 | Scheme 3 | Scheme 4 |
|---|---|---|---|---|
| Number of Kinect ® V2s | 4 | 6 | 4 | 6 |
| Minimum stable tracking number of Kinect ® V2s | 3 | 4 | 3 | 4 |
| Activity area (m$^2$) | 8 | 10.4 | 12.5 | 16.2 |
| Stable tracking area (m$^2$) | 5.8 | 6.6 | 7.2 | 6.8 |
| Assembly space coverage rate (%) | 72.3 | 82.3 | 84.2 | 83.9 |

When multiple depth sensors based on Time of Flight (TOF) or structured light are used to illuminate the scene, once the cone-shaped tracking ranges of the sensors overlap, the sensors will be interfered mutually, because any camera can receive the infrared light emitted by other cameras, thus wrongly estimating the distance. Many researchers have proposed methods to eliminate mutual interference, but the interference noise generated by infrared light modulated by Kinect® V2 based on TOF method can be ignored, especially when it is applied to joint tracking (also referred to as skeletal joint), no special anti-interference measures are implemented. Therefore, the appropriate number and arrangement of Kinect® V2s must be decided to maximize the coverage rate and minimize the interference between two adjacent Kinect® V2s. Compared with the Scheme 3, the Scheme 4 has a small angle deviation between the axis of Kinect® V2 and the nearest diagonal of the assembly work unit, which reduces the mutual interference between two Kinect® V2s in completely opposite directions, and meanwhile, the number of Kinect® V2s in stable tracking range is also minimum, so the Scheme 4 is determined as the system layout scheme.

The unmarked motion tracking system in this embodiment is composed of six Kinect® V2 sensors, six client computers and a main server. Each sensor is plugged into an independent solid state disc (SSD) microcomputer. The SSD has a higher writing speed than the conventional mechanical hard disk. Six Kinect® V2s are evenly distributed on a circle with a diameter of 5 m, and each sensor is placed at a height of 1.2 m from the ground with a tripod to realize a stable posture and flexible setting for capturing the whole human body.

Kinect® SDK software can't handle data from multiple Kinect® V2s, so each sensor is connected to the client through USB 3.0 interface. The client collects bone data (also referred to as skeletal data) through the open source toolkit provided by Microsoft and converts it into global coordinates, and finally transmits it to the client computer through USB data.

The premise of multi Kinect® data fusion is to build stable data transmission between client and server. Common communication protocols are TCP and UDP. TCP protocol is a connection-oriented, reliable end-to-end transmission protocol. Before data transmission, there will be a three-way handshake to establish a connection, and data transmission may be blocked. After data transmission, the connection will be disconnected to save resources. UDP protocol is a stateless and unreliable transmission protocol. Its advantage is the high transmission speed, but it can't guarantee the safe transmission of data. If the network access is not good, packet loss will occur. In layman's terms, TCP protocol opens up a well-connected channel for the sent data before data transmission, and ensures correct and orderly data, while UDP protocol only does its best to transmit data, but does not guarantee reliable data transmission. TCP only supports point-to-point transmission, while UDP supports one-to-one, one-to-many, many-to-one and many-to-many transmission. Considering that the system has a large number of clients, it requires high response speeds, does not allow data blocking, and does not require high data security, so UDP protocol is used for data transmission between clients and server.

Each client and server have its own IP and port number. The client sends UDP packets directionally through the IP and port number specified by the server, and the server also needs to know the source IP and port number of UDP packets when receiving data, so as to reasonably analyze the received data. In this system, the bone joint 3D data (also referred to as skeletal joint 3D data) collected by Kinect® V2 sensor in the client is converted into OSC (open sound control) data format, and the client and server (also referred to as main server) are connected to a local area network at the same time by a network switch, and the data is transmitted to the main server through OSC protocol (OSC protocol is a local area network data transmission protocol based on UDP protocol). The main server integrates the data fusion algorithms proposed by the multi-client application of skeleton information to form a robust skeleton model, and uses Unity3D engine for visualization and subsequent analysis. The skeleton data from each client is not synchronized in time. The main reason is that each sensor collects data at a rate of 30 frames per second, which is extremely high, and there is no big time jitter between frames. Even if time synchronization is not realized, more accurate multi-source skeleton information integration can be realized.

The system can capture the user's motion from six different angles, expand the tracking range, reduce the influence of mutual interference as much as possible, transform the coordinates of each skeleton into a common world coordinate system, and estimate the target motion more accurately through data fusion algorithm.

Figure 4:
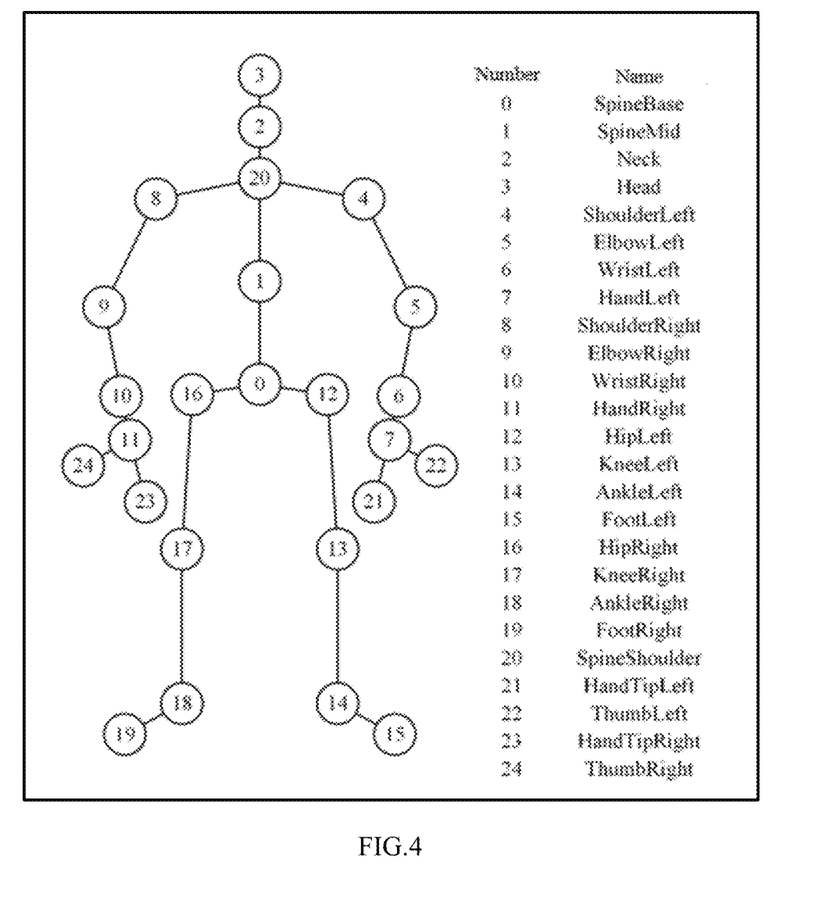
FIG. 4 is a schematic diagram of joints obtained by Kinect® V2 according to the disclosure.

The working process is as follows: obtaining bone data of single Kinect® V2: using Kinect® V2 sensor, which includes RGB sensor and depth sensor (composed of infrared (IR) camera and infrared (IR) emitter), RGB sensor is used for color data acquisition, depth sensor is used for depth data acquisition. The specific process is as follows: Kinect® V2 sensor separates the collected pixels according to the distance information in the depth image, determines the approximate area of the target (also referred to as the basic area of human body), and determines the edge area of the human body by image processing technology; then Kinect® V2 sensor uses the trained random forest model to separate the limbs of the determined edge area of the human body; finally, it analyzes the separated human body parts from multiple angles and then identifies the human joints. Therefore, Kinect® V2 sensor has three coordinate systems, namely, color coordinate system, sensor coordinate system and depth coordinate system. Kinect® V2 development kit can collect the color information, depth information and bone joint 3D information of human body, and obtain 25 bone joint data of human body in the sensor coordinate system at the rate of 30 frames per second. FIG. 4 shows the bone joints provided by Kinect® V2 sensor in the form of "matchstick figure".

According to RGB image data, depth data and audio data collected by sensors, Kinect® V2 SDK provides rich application interfaces for secondary development of software for developers to communicate with sensors, which can be used for face recognition, gesture recognition, body modeling, voice recognition, etc. This system mainly uses the whole body joint tracking API, and includes the position data, rotation data, tracking state of joints and tracking state of users, of which the position of the bone joints is represented by the X, Y and Z coordinates in the sensor three-dimensional coordinate system, which is different from the color image coordinates, and the unit is meter, where the Z axis represents the optical axis of the infrared camera and is perpendicular to the image plane.

Figure 5:
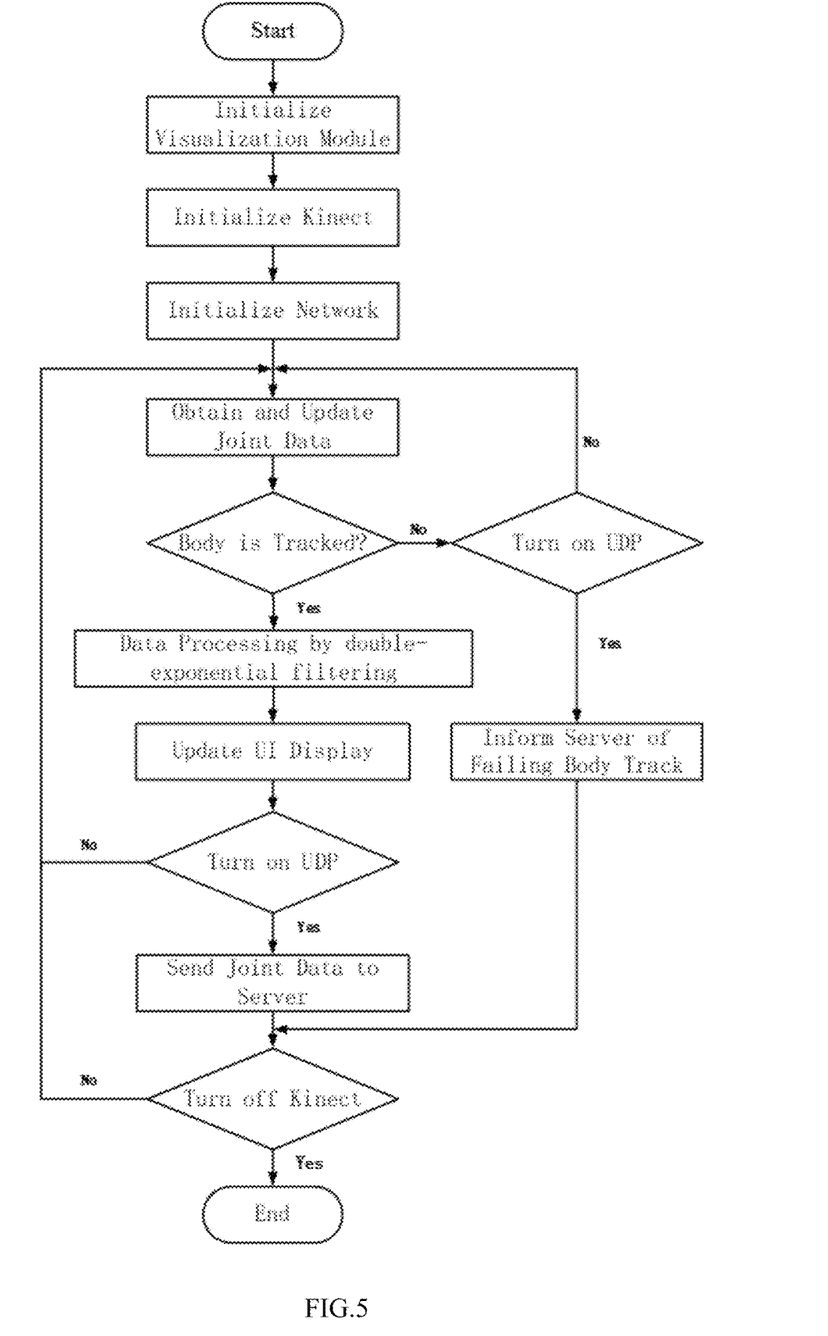
FIG. 5 is a work flow chart of the client computer according to the disclosure.

Data preprocessing and visualization of client: the function of client software mainly includes three modules, namely, data acquisition and preprocessing module, data visualization module and data communication module. The work flow is shown in FIG. 5.

Figure 6:
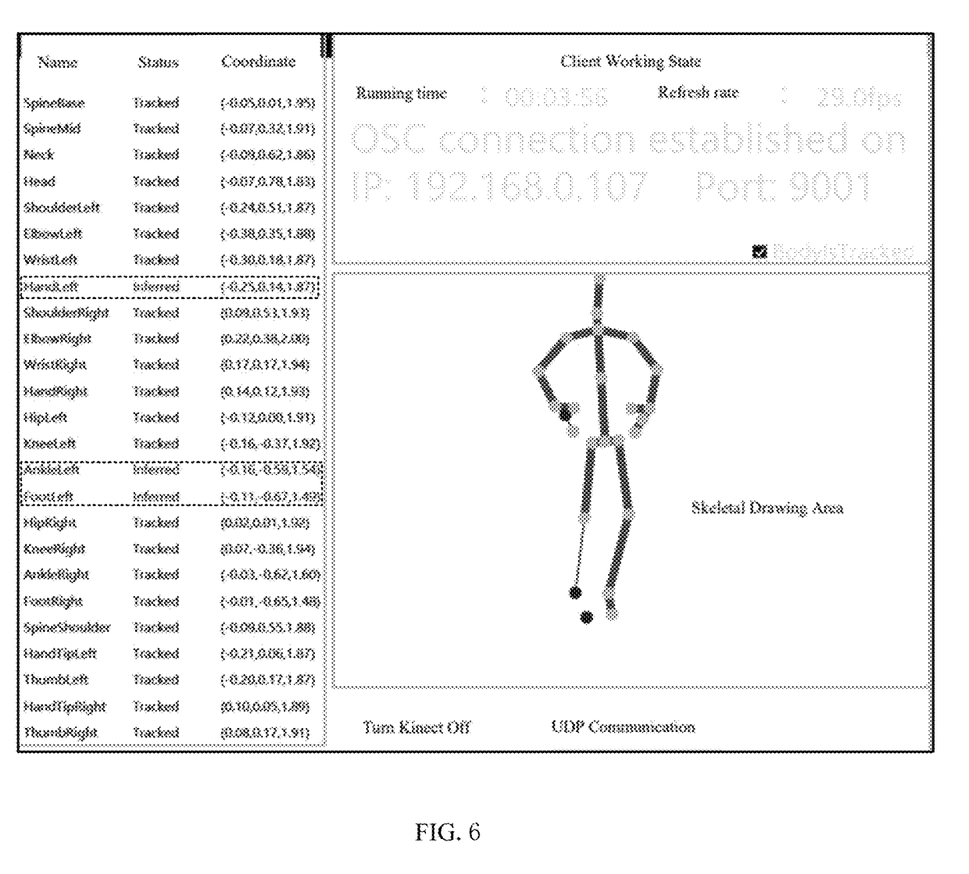
FIG. 6 is a schematic diagram of the client acquisition interface of the disclosure.

As shown in FIG. 6, the program initializes the visualization module, Kinect® V2 sensor and network module:

the left part is the information box of joint data collected by the current Kinect® V2 client, including the name of the joint, the tracking state of the joint and the three-dimensional position data of the joint;

the upper part is the working state box of the client, including the running time and the refresh frequency of the client program, the IP address and port number of the service to be connected. The check box "BodyIsTracked" indicates whether the current client tracked the human body;

the two command buttons at the bottom control the communication between Kinect® V2 and the client computer and the communication between the client computer and the server respectively, and the switch state of Kinect® V2 is indicated at the lower right corner;

The middle right part is the drawing area of bone map (also referred to as skeletal map).

When Kinect® V2 establishes communication with the client computer, the client begins to collect the skeletal information of the body in real time; when UDP communication is working, the client and the server establish communication. When the body is tracked, in order to make the joint data acquisition more stable, the joint data is processed by double exponential filtering, and the processed joint 3D data and tracking state are updated in real time and displayed visually in the client interface, as shown in FIG. 6, and then the data is sent to the server.

For example, the stable tracking joints are drawn by circle dots, and the stable tracking skeletons are drawn by thick lines.

Skeletal joints with the skeletal data tracking state "Inferred" are drawn by black circle dots, such as the "AnkleLeft" and "FootLeft" joints of the tracked user, meanwhile, the bone information (also referred to as skeletal information) of the skeletal joints with the skeletal data tracking state "Inferred" is prominently displayed in dashed box. If the confidence level of the joints at both ends of the left foot is "Inferred", the bone will not be drawn. If the joints at both ends of the left calf are "Tracked" and "Inferred" respectively, the bones will be drawn with thin gray lines.

When the client fails to track the human body, tracking is cancelled and the server is informed, and the server will not make any contribution to data fusion when processing the current frame data of the client.

What is claimed is:

1. An unmarked body motion tracking system based on multi-cameras, comprising:
 a plurality of cameras, each of the plurality of cameras is configured for acquiring depth data and joint data;
 a plurality of analysis modules, each of the plurality of analysis modules is configured for analyzing data collection characteristics of corresponding one of the plurality of cameras and transmission device assembly requirements, wherein the data collection characteristics comprise a working range of a sweep cone and physical limits of the corresponding one of the plurality of cameras;
 a plurality of clients, each of the plurality of clients is configured for receiving the joint data from corresponding one of the plurality of cameras and processing the joint data; wherein a process of the processing comprises: based on the data collection characteristics of the corresponding one of the plurality of cameras, building a client-server model to track a human body from different directions, so as to ensure that skeletons of the human body in a self-occlusion state are stably tracked by sensors of ones of the plurality of cameras at other angles;
 a plurality of output modules, each of the plurality of output modules is configured to output a layout mode and a tracking result of corresponding one of the plurality of cameras;
 wherein based on the transmission device assembly requirements, a layout of the plurality of cameras are constructed, and factors affecting the layout comprise a stable tracking area, an activity area and an assembly space coverage rate; rationality of a design method of the layout is judged based on the stable tracking area, the activity area and the assembly space coverage rate;
 a size of an assembly workspace is designed, and a center of the assembly workspace is made coincide with a center of an N-camera system comprising the plurality of the cameras;
 according to the N-camera system, a region where number of ones of the plurality of cameras for comfort tracking is more than N/2 is defined as a stable tracking region and the stable tracking area is calculated; wherein N is a positive integer greater than 1;
 according to the N-camera system, based on a cone-shaped tracking range of camera, the activity area is defined as an area surrounded by regular polygons connected with the plurality of cameras as vertices;
 a ratio of an area of a part of the stable tracking area located in the assembly workspace to an area of the assembly workspace is defined as the assembly space coverage rate.

2. The unmarked body motion tracking system based on multi-cameras according to claim 1, wherein,
 the plurality of cameras are evenly distributed on a circle with a diameter of M meters, and each of the plurality of cameras is placed at a height of 1 m-1.5 m from ground to realize stable posture and flexible setting for capturing the human body;
 the each of the plurality of cameras is connected to the corresponding client through a USB interface; the client collects the joint data through an open source toolkit provided by Microsoft and converts the joint data into global coordinates, and finally transmits the global coordinates to a client computer through USB data.

3. The unmarked body motion tracking system based on multi-cameras according to claim 1, wherein each of the plurality of cameras performs data collection at a rate of 30 frames per second, which can realize a more accurate integration of multi-source skeleton information even if a time synchronization is not realized.

4. The unmarked body motion tracking system based on multi-cameras according to claim 1, wherein each of the plurality of cameras separates collected pixel points according to distance information in a depth image comprising the depth data, determines a basic area of the human body, determines an edge area of the human body by image processing technology, and a trained random forest model is used to perform limb separation of the determined edge area of the human body to obtain separated human body parts, and finally makes multi-view-angle analysis on the separated human body parts to identify body joint points.

5. The unmarked body motion tracking system based on multi-cameras according to claim 2, wherein each of the plurality of clients comprises:
 a data acquisition and preprocessing module, configured for receiving and processing the joint data collected by a sensor of the corresponding camera;
 a data visualization module, comprising a first visualization module, a second visualization module and a third visualization module, respectively configured for displaying skeletal data information of the joint data after the processing, client working state, and a skeletal drawing area;
 wherein the data visualization module further comprises a tracking module, configured to judge whether tracking the joint data is successful; if the tracking is successful, the joint data information, the client working state and the skeletal drawing area are respectively displayed in the first visualization module, the second visualization module and the third visualization module; and if the tracking fails, current frame data is ignored without data fusion of the server;
 a data communication module, configured to establish communication between the sensor of the corresponding camera and the client, so as to be convenient for real-time collection of the joint data of the human body.

6. The unmarked body motion tracking system based on multi-cameras according to claim 5, wherein the client converts data format to the joint data expressed in a form of skeletal 3D data collected by the sensor of the corresponding camera and transmits the skeletal 3D data after the converting data format to a main server, and the main server integrates data fusion algorithms proposed by skeletal information applications from the plurality of clients to form a robust skeleton model, and performs visualization to the robust skeleton model by Unity3D engine; wherein a network switch connects the client and the main server into a local area network at the same time.

* * * * *